United States Patent [19]
Villani

[11] 3,957,360
[45] May 18, 1976

[54] SPECTACLE FRAMES WITH SPRING-LOADED HINGES

[76] Inventor: Luciano Villani, 23, Via Lungo Leno Destro, Rovereto, Italy

[22] Filed: Sept. 26, 1974

[21] Appl. No.: 509,739

[30] Foreign Application Priority Data
Oct. 4, 1973  Italy.................................. 29762/73

[52] U.S. Cl............................... 351/113; 16/128 A; 351/121; 351/153
[51] Int. Cl.²....................... G02C 5/16; G02C 5/22
[58] Field of Search.................... 351/113, 121, 153; 16/128; 2/14 T, 14 UT

[56] References Cited
UNITED STATES PATENTS
2,874,609  2/1959  Ducati................................ 351/113
3,837,735  9/1974  Guillet................................ 351/113

*Primary Examiner*—Paul A. Sacher
*Attorney, Agent, or Firm*—Michael J. Striker

[57] ABSTRACT

A hinge portion of a spectacle frame of generally lightweight construction is provided with essentially thin and limited vision obstructing side pieces. The hinge comprises a cam bearing flat metallic component fixedly secured to the respective side end of the front piece of the frame, and a subassembly comprising a ball-shaped cam follower and a spring urging the follower against the cam, the follower and the spring being guidedly housed in an axial bore provided in an elongated metallic body secured to a metallic side piece or to a metallic core of a lightweight side piece, forming the fore and hinge portion of the side piece and a part of an unitary metallic external structure therefor.

16 Claims, 4 Drawing Figures

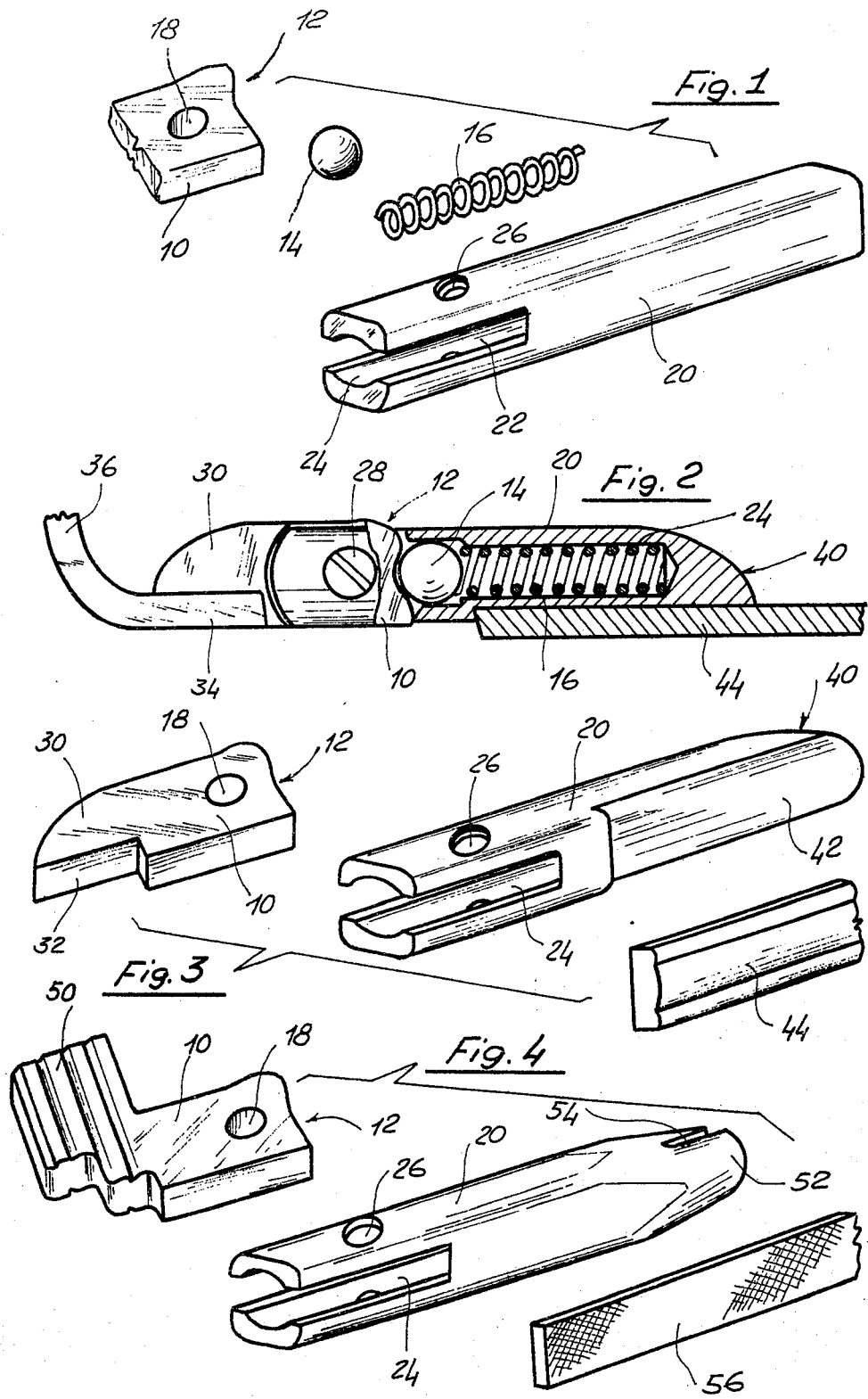

SPECTACLE FRAMES WITH SPRING-LOADED HINGES

BACKGROUND OF THE INVENTION a. The Field of the Invention

This invention is concerned with spectacle frames each of whose side pieces is connected to the front piece of the frame by a hinge, said hinge being provided with resilient means urging the side pieces into a predetermined open position with respect to said front pieces while permitting said side pieces to be further opened outwardly to a certain extent beyond the said predetermined open position, said further opening being counteracted by the resiliency of said resilient means. More particularly, this invention relates to spectacle frames wherein the hinge and resilient means comprise cam means and spring-biased cam follower means for providing the elastic resistance to further widening apart the said side pieces beyond said predetermined open position.

b. The prior Art

The provision of such spring-loaded hinge means for spectacle frames has been found to improve the comfort for the wearer of the spectacles and the positive adjustment of the spectacles to the user's head. These spectacles are widely known and in demand and, therefore, further comments thereabout are unnecessary.

On the other hand, it is also known that the conventional constructions of such spring-loaded hinge means involve not only certain serious limitations not only in the choice of materials suitable for frame manufacture, but also complicated and costly workmanship. One important limitation of such hinge means consists in the fact that the subassembly which includes the spring and the cam follower means, which is connected to the side piece or arm, is undesirably complicated and bulky, and is supposed to be wholly concealed within the side piece structure. This latter requirement leads to the manufacture of a side piece of undesirably large cross-sectional dimension in its portion adjacent to the hinge, and therefore at the side of and very close to the user's eye, thus seriously limiting the field of vision in lateral directions. As a counterpart of their advantages, such spring-loaded hinged spectacle frames appear to be and are bulky and heavy.

These limitations are in part only reduced by using hinge and spring mechanisms wherein the cam follower consists of a small ball of very hard material (such has hardened steel) biased by a small helical spring housed and guided in a bore provided in a component embedded in and secured to the side piece structure. Such a mechanism has been disclosed for example in the British Patent Specification No. 776,627. Certain advantageous modifications of such mechanisms have been also disclosed in the U.S. Pat. No. 3,644,023. Other types of such mechanisms are also known.

It is evident that to combine the well appreciated advantages of the spring-loaded hinges of the type referred to above with a spectacle frame structure of light weight construction, preferably but not exclusively metallic (such as that of the gold-plated type) and comprising relatively thin and vision unobstructing side pieces or arms, would be greatly desirable.

It is therefore a principal object of this invention to provide a new and improved spring-loaded hinge mechanism for spectacle frames of the type referred to above, said mechanism being adapted for being associated with and forming part of spectacle frames of lightweight and vision unobstructing construction, and to provide relatively thin spectacle frame side pieces or arms whose portions of which are adjacent to the frame front piece side end, embody and are essentially formed by subassemblies that comprise ball-type cam followers and biasing springs of said mechanism.

SUMMARY OF THE INVENTION

Accordingly, the invention provides a spectacle frame spring-loaded assembly including a flat, planar cam bearing component adapted to be secured to one side end of the spectacle frame front piece, said component being provided with a bore for fitting a pivot means therein, such as a pivot screw, for hingedly connecting said side end to a side arm or piece, and a subassembly comprising an elongated metallic piece of approximately square cross-sectional configuration, having a part of its length cut or grooved in one of its cross-sectional planes of symmetry for hingedly fitting the bored cam portion of said component therein, said piece being provided with a bore having an axis that is perpendicular to the plane of the cut for mating with the bore of said component when fitted in said cut, and an axial bore for housing and guiding a cam follower ball and a ball biasing spring therein, said elongated metallic piece being adapted for being lengthwise secured to a metallic spectacle side piece or side piece core.

These and other features and advantages of the invention will become apparent from the following description. A few preferred embodiments of the invention will be now detailedly described with reference to the accompanying drawing.

BRIEF DESCRIPTION OF THE DRAWING

FIG. 1 is a greatly enlarged exploded perspective view of the partially unfinished basic components of the improved hinge assembly;

FIG. 2 is a partially longitudinal sectioned top plan view of a hinge mechanism including the components of FIG. 1 used in a spectacle frame (partially shown) having metallic front piece and side pieces;

FIG. 3 is an exploded view corresponding to that of FIG. 1 with finished basic components; and FIG. 4 is an exploded view similar to FIG. 3, with finished basic components for use in a spectacle frame having a front piece of plastic material and thin side pieces of plastic material having a metallic core.

DETAILED DESCRIPTION OF THE PREFERRED EMBODIMENT

The improved hinge mechanism is formed by using preliminarily manufactured components such as shown in FIG. 1. Such components comprise a component 10 (part of which is broken away in FIG. 1) which consists of a small flat metallic part, a portion of its edge forming a cam surface 12. Such component 10 is preferably made by shearing it out from a steel sheet having a thickness ranging from 1.2 to 1.5 millimeters. This cam surface 12 is designed for cooperation when biased by a spring 16 as described below, with a cam follower ball 14, the diameter of which is preferably from 2.0 to 2.5 millimeters.

The component 10 is designed to be secured (at its portion broken away in FIG. 1, and which can be of different shapes, also as described below) to one side end of the spectacle front piece, the component 10, having a through bore 18 for providing the hinge connection. The hinge is formed by the pivotal connection of said component 10 with a subassembly designed to form a part of a side piece, the structural body of said subassembly consisting of metallic piece or connecting element 20.

This piece 20 consists, preferably, of a length of an extruded metallic stock of essentially square cross-sectional configuration of from 3 by 3 millimeters to 4 by 4 millimeters, and preferably having rounded off corners, as shown. The length of the stock, preferably from 20 to 30 millimeter long, is transversely cut at 22 in one of its planes of symmetry for slidingly fitting of a part of the component 10 therein, and has an axial bore 24 extending over a part of its length beyond the cut 22, provide a for guidedly fitting the ball 14 and the spring 16 therein, and it also has a bore 26, which can be aligned with the bore 18 of component 10 to provide via a hinge connection, the pivot consisting of a pivot screw 28, as shown in FIG. 2, for example.

The specific configuration of the cam edge 12 of the component 10 and its cooperation with the cam follower ball 14, when urged thereagainst by the spring 16, will not be herein described, as such features are well known in the art and do not form part of the present invention.

When a hinge assembly comprising said components is to be associated to a spectacle frame including a metallic front piece and metallic side pieces, such components are formed and/or machined in the configurations shown in FIG. 3, to provide the hinged structure shown in FIG. 2, other specific configurations being however, possible for meeting the specific types and configurations of the spectacle frame.

A part 30 of the component 10 (that is the portion broken away in FIG. 1, and that remains external to the elongated body or piece 20) is suitably tapered and provided with a stepped recess 32 adapted to receive and to be mounted to an outermost portion 34 (FIG. 2) of the side end of a spectacle frame front piece 36 (fragmentarily shown), the connection being preferably made by welding. A flank of the elongated piece 20 which faces outwardly in the spectacle in use, is suitably tapered at 40 and provided with an elongated stepped recess 42 in which a front portion of a metallic side piece 44 (fragmentarily shown) can be seated and secured, preferably by welding.

This metallic side piece 44, of lightweight structure, conventionally consists of a generally thin metallic rod or wire, and comprises a flattened portion adjacent to the hinge. The front portion of the said piece 44 shown in FIG. 3 corresponds to said flattened portion. Preferably the component 20 is secured at 42 to side piece 44 having a front portion of height (vertical dimension) equal to that of same elongated piece 20, that is of the outwardly facing surface of the recess 42. Upon precise fitting and welding of the portion of the side piece 44 in the recess 42, the side piece and the elongated piece 44 20 together form an integral metallic structure, and therefore the hinge subassembly including said elongated piece 20 forms the thickened portion adjacent to the hinge of the spectacle, of the side piece 44 or side arm of the spectacle frame. The metallic structural unit consisting of the front piece 36 and its associate components 30, 10 (at both sides) and respectively of the components 20, 44, (to form both side pieces) can be advantageously chrome plated, silver plated and preferably gold plated or otherwise subjected to any suitable metal surface coating process, providing structures having the appearance of compactness and which are lightweight and only insignificantly obstruct vision.

The new hinge can however, be advantageously associated with a non-metallic spectacle frame having generally lightweight frame components, such as those manufactured of polymeric substances or resins. In such a case, the components shown in FIG. 1, namely the components 10 and 20, can be configurated and machined as shown in FIG. 4.

The cam component 10 is provided with a suitably indented portion 50 adapted for being fixedly secured, preferably by fitting it in the side end of a resinous spectacle front piece, by means of a known ultrasonic vibration or welding process, for example. In turn, the elongated component 20 is prepared for being fixedly secured to a resinous side piece metallic core, a first portion of which is indicated at 56. The component 20 is, in such an event, tapered at 52 at its end remote from the hinge and provided with a cut 54 for fitting and welding of the end of the side piece core 56 thereto. The resinous coating (not shown) of said core is preferably extended to at least in part overlap the taper 52 to provide a more secure connection and esthetically pleasing junction between metallic and non-metallic parts.

Of course the invention may be put to practice with embodiments different from those described without departing from the scope of the invention.

I claim:

1. A spectacle frame conprising a front piece having respectively spaced side end portions; a cam element rigidly connected to each one of said side end portions of said front piece and with said cam element having a cam surface; a connecting element for each side end portion having a substantially flat end portion; means for mounting said connecting elements on said side end portions for movement between a closed and an open position; cam follower means accommodated in each of said connecting elements and including at least one cam follower member and means for urging said cam follower member into contact, with said cam surface; and side pieces, each side piece having a substantially flat end portion rigidly connecting one side piece to and overlying a respective one of said connecting elements at only one side thereof which faces away from said front piece when the respective connecting element is in said closed position thereof, whereby said end portion of each of said side pieces at least partly conceals said respective connecting element from view in a direction normal to and facing said one side of said connecting element.

2. A spectacle frame as defined in claim 1, wherein said mounting means includes a pivot connecting said cam element with said connecting element.

3. A spectacle frame as defined in claim 1, wherein said urging means includes a helical compression spring.

4. A spectacle frame as defined in claim 1, wherein said connecting element is an elongated tubular member; and wherein said cam follower member and said urging means are supported within said tubular member for movement of said cam follower member longitudinally of said tubular member.

5. A spectacle frame as defined in claim 1, wherein said cam follower member is of a spherical configuration.

6. A spectacle frame as defined in claim 1, wherein said connecting element is of a metallic material.

7. A spectacle frame as defined in claim 1, wherein said connecting element is of an elongated tubular configuration and has a substantially square cross section.

8. A spectacle frame as defined in claim 1, wherein said one side of said connecting element is provided with a recess; and wherein said flat portion of said side piece is at least partly accommodated in said recess.

9. A spectacle frame as defined in claim 1, wherein said cam element has a substantially flat portion; and wherein said connecting element is elongated and has at least one longitudinally extending slot for receiving said portion of said cam element therein.

10. A spectacle frame as defined in claim 9, wherein said cam element has an additional portion affixed to said side portion of said front piece.

11. A spectacle frame as defined in claim 9, wherein said additional portion of said cam element is provided with a recess; and wherein said front piece is of a metallic material and has an extension at said one side thereof which is received in said recess and affixed to said additional portion of said cam element.

12. A spectacle frame as defined in claim 9, wherein said front piece is of a synthetic plastic material; and wherein said additional portion of said cam element is corrugated and embedded in said front piece.

13. A spectacle frame as defined in claim 1, wherein said connecting element is elongated and has a longitudinally extending recess at said one side thereof having a longitudinally extending face of a predetermined transverse dimension; and wherein said end portion of said side piece has a dimension corresponding to said predetermined transverse dimension so that said end portion overlies and conceals said longitudinally extending face.

14. A spectacle frame as defined in claim 12, wherein said end portion of said side piece is welded to said longitudinally extending face.

15. A spectacle frame as defined in claim 13, wherein said elongated connecting element has a dimension coextensive with and corresponding to said predetermined transverse dimension.

16. A spectacle frame as defined in claim 13; and further comprising a unitary layer of metallic coating at exposed surfaces of said connecting element and of at least said end portion of said side piece.

* * * * *